(12) United States Patent
Xi (10) Patent No.: US 11,323,573 B2
(45) Date of Patent: May 3, 2022

(54) CALL MANAGEMENT METHOD AND APPARATUS

(71) Applicant: BEIJING XIAOMI MOBILE SOFTWARE CO., LTD., Beijing (CN)

(72) Inventor: Chunyan Xi, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 93 days.

(21) Appl. No.: 17/006,868

(22) Filed: Aug. 30, 2020

(65) Prior Publication Data

US 2021/0306464 A1  Sep. 30, 2021

(30) Foreign Application Priority Data

Mar. 27, 2020  (CN) .......................... 202010232131.8

(51) Int. Cl.
*H04M 3/56* (2006.01)
*H04W 76/25* (2018.01)
*H04W 4/06* (2009.01)

(52) U.S. Cl.
CPC .............. *H04M 3/563* (2013.01); *H04W 4/06* (2013.01); *H04W 76/25* (2018.02)

(58) Field of Classification Search
CPC ........ H04M 3/563; H04M 1/724; H04M 3/56; H04M 2250/62; H04M 2207/18; H04W 76/25; H04W 4/06
See application file for complete search history.

(56) References Cited

U.S. PATENT DOCUMENTS

| | | | |
|---|---|---|---|
| 10,531,045 B2 | 1/2020 | Toyoda et al. | |
| 2015/0029901 A1* | 1/2015 | Patel | H04L 65/4038 370/261 |
| 2015/0126169 A1 | 5/2015 | Kerger et al. | |
| 2016/0226930 A1 | 8/2016 | Zhang et al. | |
| 2016/0269552 A1 | 9/2016 | Gunhalkar et al. | |
| 2016/0295169 A1 | 10/2016 | Hiller et al. | |
| 2016/0352911 A1 | 12/2016 | Schmitz et al. | |
| 2019/0220335 A1 | 7/2019 | Pather et al. | |
| 2020/0059628 A1 | 2/2020 | Cranfill et al. | |

FOREIGN PATENT DOCUMENTS

| | | |
|---|---|---|
| CN | 1472962 A | 2/2004 |
| CN | 102307269 A | 1/2012 |
| CN | 102696213 A | 9/2012 |
| CN | 102811269 A | 12/2012 |
| CN | 104284034 A | 1/2015 |

(Continued)

OTHER PUBLICATIONS

Zhao, Yilin. "Standardization of mobile phone positioning for 3G systems." IEEE Communications magazine 40.7 (2002) (Year: 2002).*

(Continued)

*Primary Examiner* — Sharad Rampuria
(74) *Attorney, Agent, or Firm* — Syncoda LLC; Feng Ma (57) ABSTRACT

A call management method includes: detecting a call type of a call; starting a call management interface corresponding to a current call type, when the call type of the call is changed. The management of the user interface of the conference call can realize flexible switching and changing of the interface when participants of the conference call change.

17 Claims, 7 Drawing Sheets

(56) References Cited

FOREIGN PATENT DOCUMENTS

| | | |
|---|---|---|
| CN | 104539815 A | 4/2015 |
| CN | 104836887 A | 8/2015 |
| CN | 105872271 A | 8/2016 |
| CN | 105915521 A | 8/2016 |
| CN | 106937008 A | 7/2017 |
| CN | 107360116 A | 11/2017 |
| CN | 108206815 A | 6/2018 |
| CN | 108632453 A | 10/2018 |
| CN | 110113483 A | 8/2019 |
| CN | 110365931 A | 10/2019 |
| EP | 0898424 A2 | 2/1999 |

OTHER PUBLICATIONS

Extended European Search Report in Application No. 20198721.1, dated Mar. 17, 2021.
Apple Inc: "How to make a conference call from your iPhone—Apple Support", Mar. 24, 2020, XP055783425 https://support.apple.com/en-us/HT211110.
CN Notice of Allowance in Application No. 202010232131.8, dated Jul. 2, 2021.

\* cited by examiner

CALL MANAGEMENT METHOD AND APPARATUS

CROSS-REFERENCE TO RELATED APPLICATION

This application claims priority to Chinese Patent Application No. 202010232131.8 filed on Mar. 27, 2020, the disclosure of which is hereby incorporated by reference in its entirety.

BACKGROUND

At present, when there are only two participants on a conference call (that is, a two-way call), it will be still considered as a conference call according to the 3GPP protocol. The states from Modem to the Radio Interface Layer (RIL), to the Telephony/Telecom layer at the Application Processor (AP) side, and finally to the application layer are all in the conference state. The state of the call interface displayed to the user is still the conference call interface, except that only two participants remain on the interface.

SUMMARY

The present disclosure relates generally to the field of wireless communication applications, and more specifically to a call management method and apparatus.

According to a first aspect of embodiments of the present disclosure, there is provided a call management method, including:
detecting a call type of a call;
starting a call management interface corresponding to a current call type, when the call type of the call is changed.

According to a second aspect of embodiments of the present disclosure, there is provided a call management apparatus, including:
a type detection module, configured to detect a call type of a call;
an interface switching module, configured to start a call management interface corresponding to a current call type, when the call type of the call is changed.

According to a third aspect of embodiments of the present disclosure, there is provided a computer apparatus, including:
a processor;
a memory, for storing instructions executable by the processor,
wherein the processor is configured to:
detect a call type of a call;
start a call management interface corresponding to a current call type, when the call type of the call is changed.

According to a fourth aspect of embodiments of the present disclosure, there is provided a non-transitory computer-readable storage medium, when instructions in the storage medium are executed by a processor of a mobile terminal, enabling the mobile terminal to perform a call management method, the method including:
detecting a call type of a call;
starting a call management interface corresponding to a current call type, when the call type of the call is changed.

It should be noted that the above general description and the following detailed description are merely exemplary and explanatory and should not be construed as limiting of the present disclosure.

BRIEF DESCRIPTION OF THE DRAWINGS

The drawings herein are incorporated into and constitute a part of this specification, show embodiments consistent with this disclosure, and are used together with the specification to explain the principles of this disclosure.

DETAILED DESCRIPTION

Exemplary embodiments will be described in detail herein, examples of which are shown in the drawings. When referring to the drawings below, unless otherwise indicated, the same numerals in different drawings represent the same or similar elements. The implementations described in the following exemplary embodiments do not represent all embodiments consistent with the present disclosure. Rather, they are merely examples of apparatuses and methods consistent with some aspects of the present disclosure as detailed in the appended claims.

From user experience perspective, when only two users are in a conference call, there is only one passively answering participant, which is equivalent to a single line call between the calling and called parties, but the displayed interface is still a conference call interface since the state is conference, resulting in poor user experience.

Specifically, in a scenario where user A, user B, and user C are in a conference call, after user C hangs up, only user A and user B are in the call, and at this time, it is still the conference call interface. As for the user, only user A and user B are in the call at present, it is expected to display an interface as that displayed when the user A and user B are in a single line call normally. As such, the user experience is poor.

In order to solve the above problems, the embodiments of the present disclosure provide a call management method and apparatus. By detecting a call type of a call, and starting a call management interface corresponding to a current call type when the call type of the call is changed, the call management interface is matched with a current usage situation, and the problem of poor user experience is solved.

In order to better explain the technical solutions provided by the embodiments of the present disclosure, the specific implementation solution of the conference call will now be described.

Figure 1:
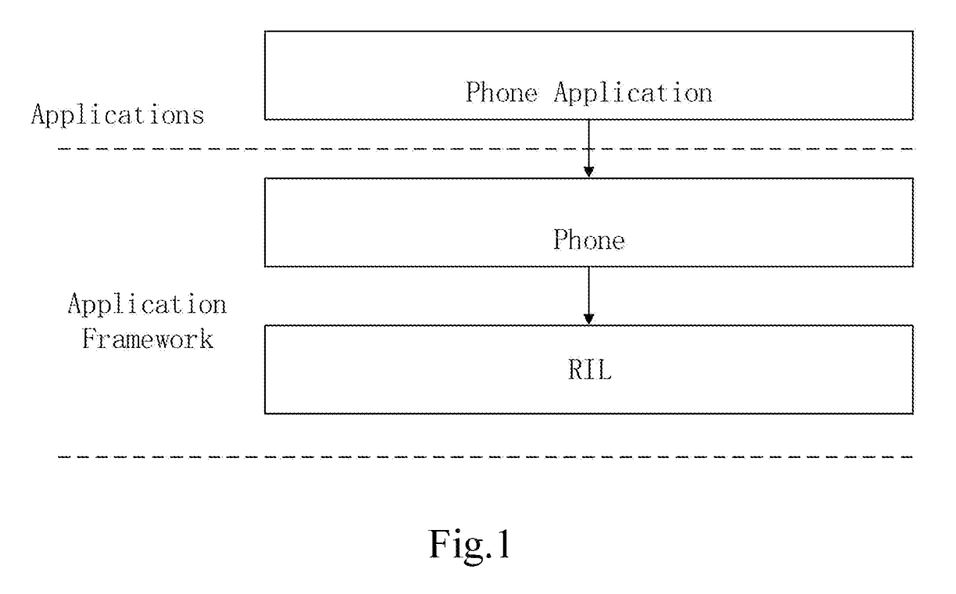
FIG. 1 is a schematic structural diagram of a terminal communication system.

As shown in FIG. 1, it is a schematic diagram of the architecture of the terminal communication system. They are the Modem, RIL, Telephony Java Framework layer, and Application, from a bottom layer to an upper layer.

The terminal communication system has an Application Processor (AP) side and a Baseband Processor (BP) side. The BP side generally refers to the Modem, which is responsible for interacting with the network, reporting a network state to the AP side, and accepting a request of the AP side and sending it to the network.

The RIL is a wireless interface layer, which is an abstraction layer between Telephony and Modem. It is used to realize the communication conversion between the upper layer Telephony and the bottom layer Modem. Telephony and Modem have different Commands to implement communication functions, and implementation manners of Modem between different vendors are also different. The RIL is used to shield underlying differences.

The Framework layer is commonly referred to as the Telphony framework, including telephony and telecom services, and provides a unified interface to the upper layer, such as the current registered network state, call state, and data state, or the like.

The Application, such as incallui, is used to display interfaces of ordinary calls, video calls, and conference calls, and is a window presented to the users.

The Conference Call is often called a teleconference/multiparty call. It generally refers to multiple devices (such as A, B, and C devices) participating in one certain call at the same time, rather than the common two-party call. Among the participants in the conference call, one party acts as an active calling side participant host (for example, device A), which is an initiator of the conference call and can manage this conference call. The other participants (such as devices B and C) act as passive receiving side participants, peercalls, and these two participants do not have the ability to operate and manage this conference call.

The Framework layer and Application layer mainly use two service modules (Telephony and Telecom) and one interface display module (call interface, IncallUI). Telephony is responsible for processing the interaction with the bottom layer to save the call state, connection state and conference state. Telephony and Telecom save information of the conference and conference member and inform the conference information to IncallUI. The IncallUI will follow up the conference state and display different interfaces correspondingly.

There are two common manners to initiate a conference call.

The first manner is merging two single line calls into a conference call, which is the most common manner. For example, A dials a call to B, and after B is connected, A dials a call to C; after C is connected, A can merge the two calls into a conference call.

The second manner is dialing a Conference Call directly.

Figure 2:
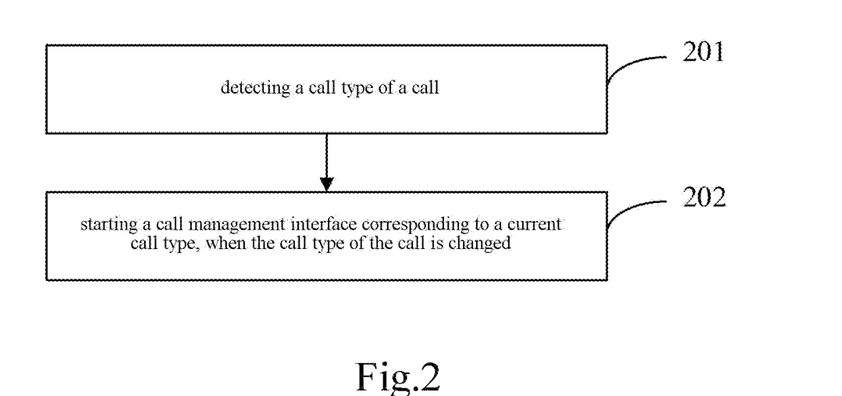
FIG. 2 is a flow chart showing a call management method according to some embodiments.

Some embodiments of the present disclosure provide a call management method. The process of switching call management interfaces using this method is shown in FIG. 2 and includes following steps.

In step 201, a call type of a call is detected.

In this step, a call module such as a call application on the active calling side detects the call type of the call. Preferably, continuous detection is performed.

The call type includes at least any or all of:

a conference call, a single line call, wherein the number of participants in the conference call is at least three, and the number of participants in the single line call is two.

The conference call includes one active calling side participant and at least two passive answering side participants. The single line call includes one active calling side participant and one passive answering side participant.

In step 202, a call management interface corresponding to a current call type is started when the call type of the call is changed.

In this step, when the call type is changed, it means that the applicable call management interface also needs to change accordingly. As for a conference call, the applicable call management interface corresponds to a conference call management interface, including function buttons used in the conference call. As for a single line call, the applicable call management interface corresponds to a single line call management interface, which is a call management interface when a call is initiated by a recipient.

The call management interface is switched according to the type of the call, and the state of the conference call is optimized from the Framework layer and Application layer on the AP side, so that the call management interface matches with the current application scenario, the operation is more convenient, and the user experience is improved.

Some embodiments of the present disclosure further provide a call management method. A specific process for switching between different call management interfaces by using the method is as follows.

In a first situation, when the call type of the call is changed from the conference call to the single line call, a connection state of the conference call in a background is maintained and a call management interface corresponding to the single line call is started.

In this step, all passive answering side participants are deleted from a tracking record of a Telephony layer; a Telecom layer is notified that the current call type is no longer a conference call type; then a conference capability is deleted from recorded information, and a name and/or an address of the current call is set as a name and/or an address of a remaining individual passive answering side participant; the interface is rearranged and the call management interface corresponding to the single line call is started, after a telephone service interface (IncallUI) layer detects that the conference capability is deleted.

Specifically, when there are only two participants remaining in the conference call (one active calling side participant and one passive answering side participant), all passive answering side participants are deleted from the tracking record of the Telephony layer first, and then the Telecom layer is notified that the current call is no longer a conference call type; a conference capability {@link Connection #CAPABILITY_MANAGE_CONFERENCE} function is deleted from recorded information, and finally, a name and/or an address is set as a name and/or an address of a remaining individual passive answering side participant. When the IncallUI finds that the current call is no longer CAPABILITY_MANAGE_CONFERENCE, the interface is rearranged and the call management interface corresponding to the single line call is switched to and activated, displayed as the interface when two people normally make an ordinary call. At this time, at the active calling side, the user will see an interface when the two people make an ordinary call.

During this process, only the IncallUI module performs switching of the call management interface, while in the background, the bottom layer still maintains the state of the conference call.

In a second situation, when the call type of the call is changed from the single line call to the conference call, a connection state of the conference call in a background is maintained and a call management interface corresponding to the conference call is started.

In this step, all passive answering side participants of the conference call are re-added to a tracking record of a Telephony layer, after the Telephony layer detects that the number of the passive answering side participants is greater than 1;

a conference capability is added to recorded information and a Telecom layer is notified that the current call type is the conference call;

the interface is rearranged and the call management interface corresponding to the conference call is started, after an IncallUI layer detects that the conference capability is added.

When the call type is a single line call (and the background is a conference call), if another passive answering side participant wants to join, it only needs to add the passive answering side participant as a contact to dial normally. After the call is connected, since behaviors of the bottom layer Modem and the network side are not changed, the network and Modem still dispose according to the conference call, and the reported connection state is still the Conference Call state. After the Telephony finds that the number of passive answering side participants is greater than 1, it will automatically switch to the conference call, re-add participants of the conference call, set the conference capability and notify the Telecom that the type of current call is a conference call, so that IncallUI learns about the call has been changed to the conference call, it will rearrange the call management interface corresponding to the conference call to display to the user. In this way, when a new Conference Event Package (CEP) is obtained, the new passive answering side participant can be added to the conference call, and the underlying processing flow is not changed, and the user interface is switched.

Figure 3:
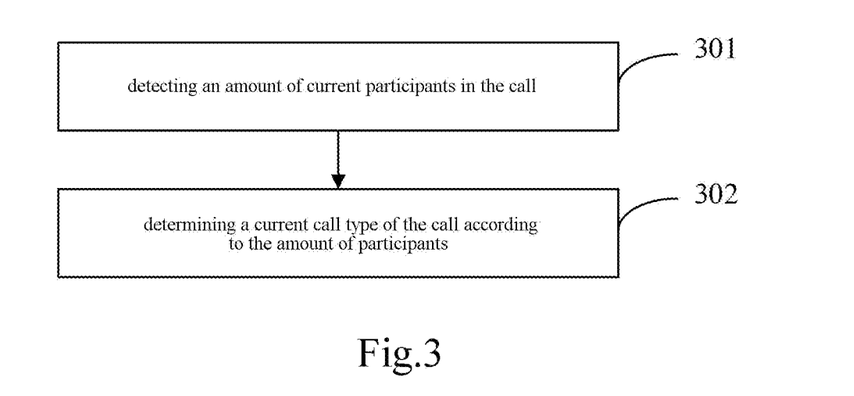
FIG. 3 is a flow chart showing a call management method according to some embodiments.

Some embodiments of the present disclosure further provide a call management method. The process for detecting a call type using this method is shown in FIG. 3 and includes following steps.

In step 301, a number of current participants in the call is detected.

In this step, a number of current participants in the call is detected. The participants include active calling side participants and passive answering side participants. In general, there is only one active calling side participant, and at least one passive answering side participant.

The detection of the number of participants can be performed periodically, or the detection of the number of current participants can be triggered when a new participant joins the call or a participant exits the call, so that the changes of the number of participants can be found in time.

In step 302, a current call type of the call is determined according to the number of participants.

The call type includes at least any or all of:
a conference call, a single line call,
wherein the number of participants in the conference call is at least three, and the number of participants in the single line call is two.

In this step, the current call type of the call is determined according to the detection result of the number of participants. When the number of participants is greater than or equal to three, it is considered to still be in a conference call where multiple people participate and the call type is the conference call; and when the number of participants is two, it is considered to be an original single line call type between two people in form, and the call type is the single line call.

It should be noted that the determination of the call type herein is limited to the application layer, and further limited to the application layer on the active calling side. The purpose of determining the call type in this step is to configure the user interface in a more friendly form, without modifying background processes and underlying operations.

Some embodiments of the present disclosure further provide a call management method, which configures call management interfaces respectively corresponding to different call types, so that after the current call type is determined, the corresponding call management interface can be switched according to the call type, the call management interface can be updated in time to adapt to the current usage environment, and the user experience is improved.

Preferably, as for the switching of the call management interface, a control switch can also be added to control the opening and closing of this function. Operator control can also be added, and operators can be followed up to customize whether to enable this function. Or, regional control can be added, for example, if India wants to use this function, it will be customized for India, and as for other regions, the function will be closed.

Figure 4:
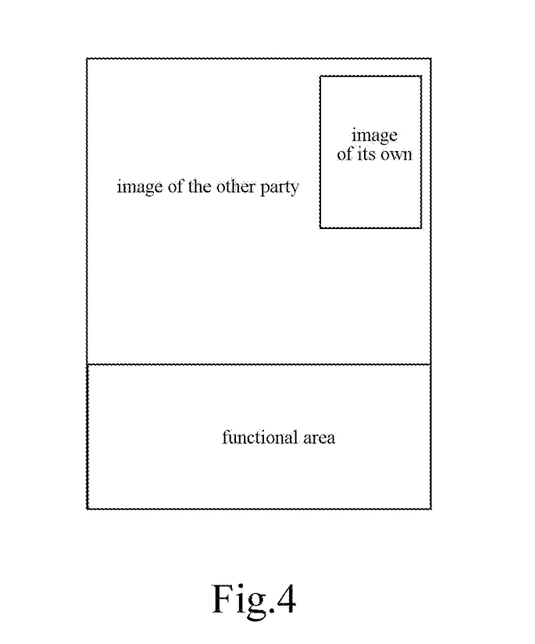
FIG. 4 is a diagram of a call interface of a video call of a single line call type.
Figure 5:
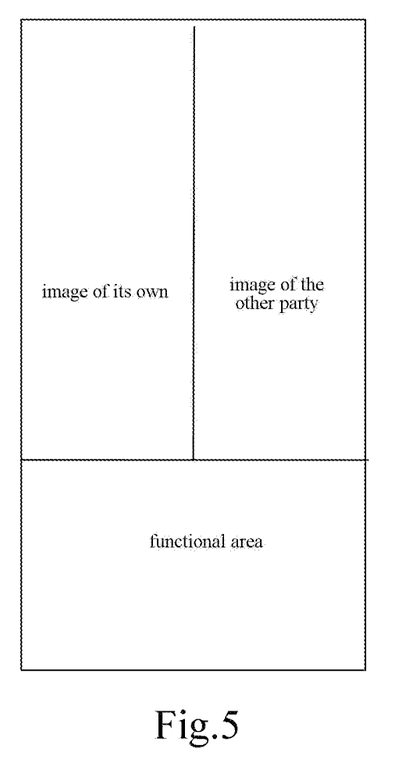
FIG. 5 is a diagram of a call interface of a video call of a conference call type.

The calls involved in the embodiments of the present disclosure may be video calls or voice calls. As shown in FIG. 4, it is an example of a call interface of a video call of a single line call type. Display positions of the image of the other party and the image of its own can be exchanged. As shown in FIG. 5, it is an example of a call interface of a video call of a conference call type, where image display regions of multiple participants have basically the same areas and are displayed side by side.

Figure 6:
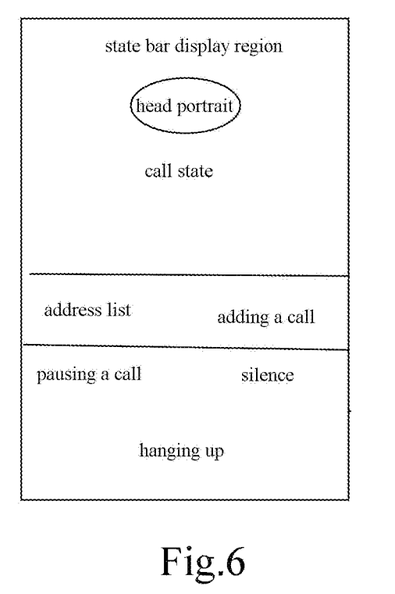
FIG. 6 is a diagram of a call interface of a voice call of a single line call type.
Figure 7:
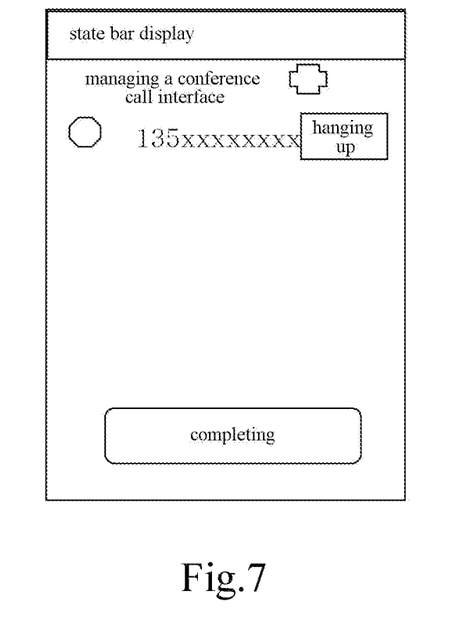
FIG. 7 is a diagram of a call interface of a voice call of a conference call type.

As shown in FIG. 6, it is an example of a call interface of a voice call of a single line call type. The management functions on the call management interface are rich and intuitive. As shown in FIG. 7, it is an example of a call interface of a voice call of a conference call type. The focus of the call management interface is to manage participants.

Figure 8:
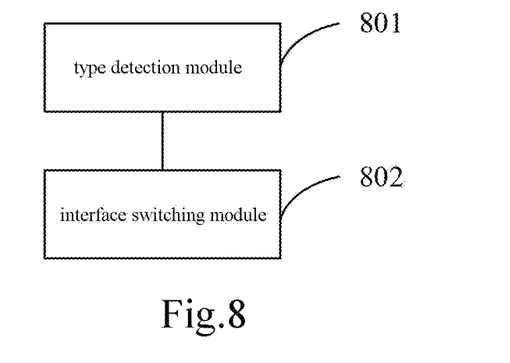
FIG. 8 is a block diagram of a call management apparatus according to some embodiments.

Some embodiments of the present disclosure further provide a call management apparatus, whose structure is shown in FIG. 8 and includes:

a type detection module 801, configured to detect a call type of a call;

an interface switching module 802, configured to start a call management interface corresponding to a current call type, when the call type of the call is changed.

Figure 9:
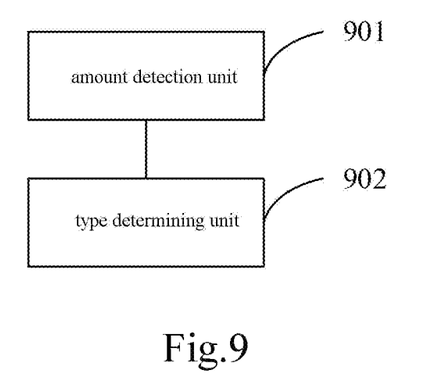
FIG. 9 is a schematic structural diagram of a type detection module 801 according to some embodiments.

Preferably, the structure of the type detection module 801 is shown in FIG. 9 and includes:

an amount detection unit 901, configured to detect a number of current participants in the call;

a type determining unit 902, configured to determine a current call type of the call according to the number of participants.

Preferably, the call type includes at least any or all of:
a conference call, a single line call,
wherein the number of participants in the conference call is at least three, and the number of participants in the single line call is two.

Figure 10:
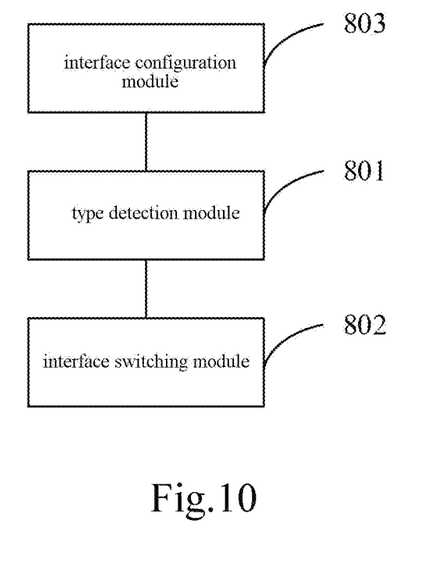
FIG. 10 is a block diagram of a call management apparatus according to some embodiments.

The apparatus is shown as FIG. 10 and further includes:
an interface configuration module 803, used to configure respective corresponding call management interfaces for different call types.

Figure 11:
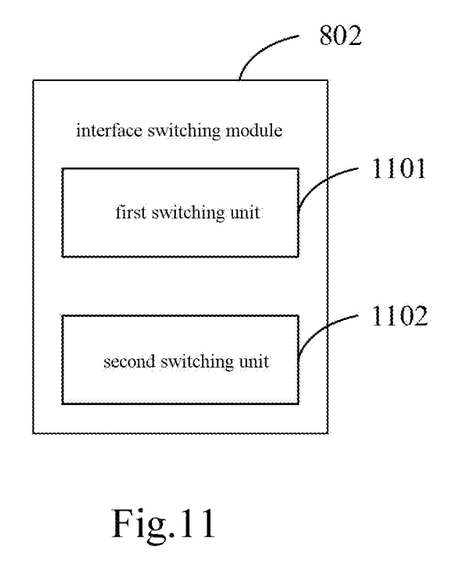
FIG. 11 is a schematic structural diagram of an interface switching module 802 according to some embodiments.

Preferably, the structure of the interface switching module 802 is shown in FIG. 11 and includes a first switching unit 1101 and a second switching unit 1102.

The first switching unit 1101 is configured to maintain a connection state of the conference call in a background and start a call management interface corresponding to the single line call, when the call type of the call is changed from the conference call to the single line call.

Specifically, the first switching unit 1101 is configured to control to delete all passive answering side participants from a tracking record of a Telephony layer; notify a Telecom layer that the current call type is no longer a conference call type;

delete a conference capability from recorded information, and set a name and/or an address of the current call as a name and/or an address of a remaining individual passive answering side participant;

rearrange the interface and start the call management interface corresponding to the single line call, after a telephone service interface layer detects that the conference capability is deleted.

The second switching unit 102 is configured to maintain a connection state of the conference call in a background and start a call management interface corresponding to the conference call, when the call type of the call is changed from the single line call to the conference call.

Specifically, the second switching unit 1102 is configured to control to re-add all passive answering side participants of the conference call to a tracking record of a Telephony layer, after the Telephony layer detects that the number of the passive answering side participants is greater than 1;

add a conference capability to recorded information and notify a Telecom layer that the current call type is the conference call;

rearrange the interface and start the call management interface corresponding to the conference call, after a telephone service interface layer detects that the conference capability is added.

The above call management apparatus can be integrated into the telephone terminal, and the terminal can realize corresponding functions. Regarding the apparatus in the above embodiment, the specific manner in which each module performs operations has been described in detail in the embodiment related to the method, and will not be elaborated herein.

Some embodiments of the present disclosure further provide a computer apparatus, including:
a processor;
a memory, for storing instructions executable by the processor,
wherein the processor is configured to:
detect a call type of a call;
start a call management interface corresponding to a current call type, when the call type of the call is changed.

The technical solutions provided by embodiments of the present disclosure may include following beneficial effects: a call type of a call is continuously detected during the call, and a call management interface corresponding to a current call type is started when the call type of the call is changed, which realizes flexible switching and changing of the interface when participants of the conference call change, solves the problem of poor user experience when a conference call interface is used in a single line call, and improves the user experience.

Figure 12:
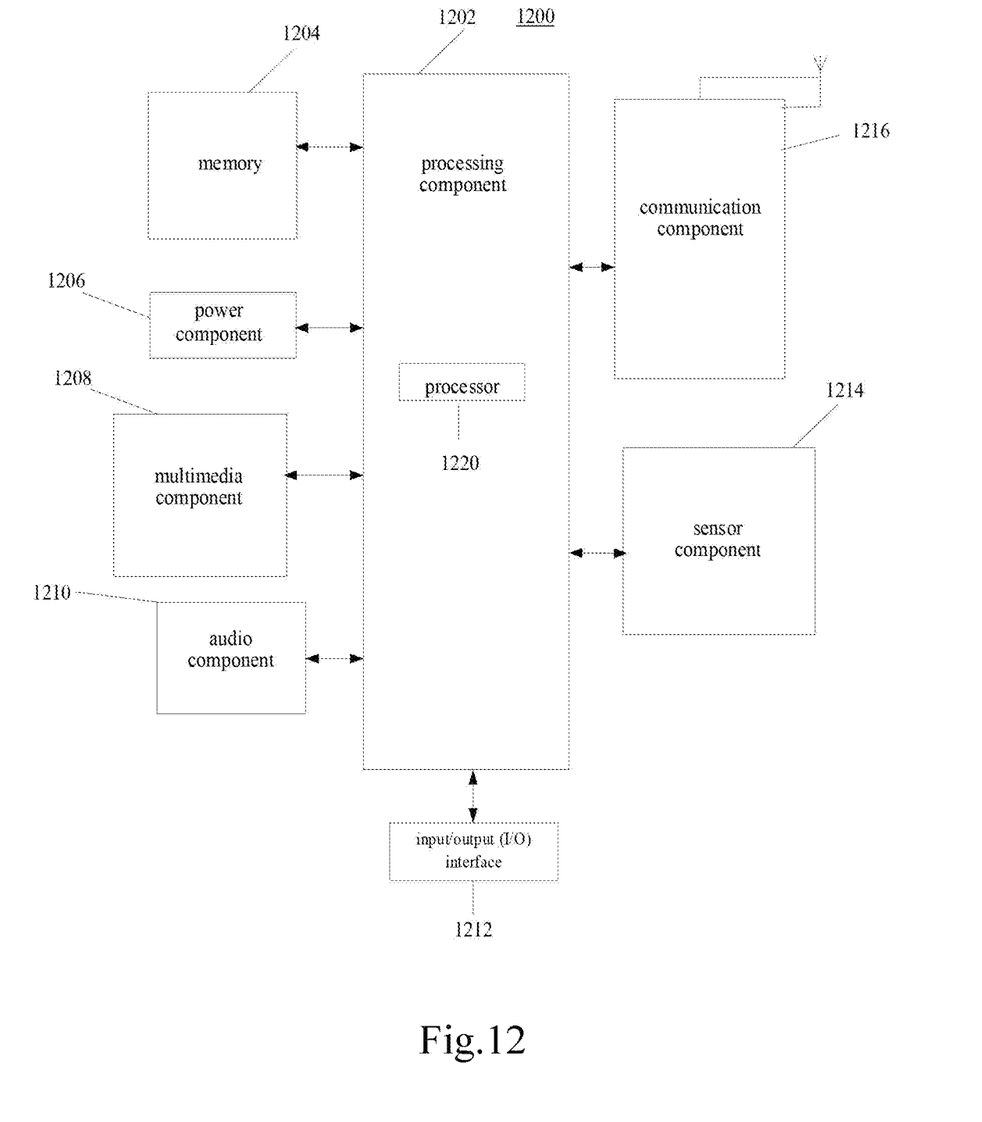
FIG. 12 is a block diagram of an apparatus according to some embodiments (a general structure of a mobile terminal).

FIG. 12 is a block diagram showing a call management apparatus 1200 according to some embodiments. For example, the apparatus 1200 may be a mobile phone, computer, digital broadcasting terminal, messaging device, game console, tablet device, medical device, fitness device, personal digital assistant, or the like.

Referring to FIG. 12, the apparatus 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls the overall operations of the apparatus 1200, such as the operations associated with display, telephone calls, data communications, camera operations, and recording operations. The processing component 1202 can include one or more processors 1220 to execute instructions to perform all or part of the steps in the above described methods. Moreover, the processing component 1202 can include one or more modules to facilitate the interaction between the processing component 1202 and other components. For example, the processing component 1202 can include a multimedia module to facilitate the interaction between the multimedia component 1208 and the processing component 1202.

The memory 1204 is configured to store various types of data to support the operation of the apparatus 1200. Examples of such data include instructions for any application or method operated on the apparatus 1200, such as the contact data, the phone book data, messages, pictures, videos, and the like. The memory 1204 can be implemented by any type of volatile or non-volatile storage device, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the apparatus 1200. The power component 1206 can include a power management system, one or more power sources, and other components associated with the generation, management, and distribution of power in the apparatus 1200.

The multimedia component 1208 includes a screen providing an output interface between the apparatus 1200 and the user. In some embodiments, the screen can include a liquid crystal display (LCD) and a touch panel (TP). In some embodiments, an organic light-emitting diode (OLED) display or other types of displays can be employed.

If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1208 includes a front camera and/or a rear camera. When the apparatus 1200 is in an operation mode, such as a photographing mode or a video mode, the front camera and/or the rear camera can receive external multimedia data. Each of the front camera and the rear camera may be a fixed optical lens system or have focus and optical zoom capability.

The audio component 1210 is configured to output and/or input an audio signal. For example, the audio component 1210 includes a microphone (MIC) configured to receive an external audio signal when the apparatus 1200 is in an operation mode, such as a call mode, a recording mode, and a voice recognition mode. The received audio signal may be further stored in the memory 1204 or sent via the communication component 1216. In some embodiments, the audio component 1210 also includes a speaker for outputting the audio signal.

The I/O interface 1212 provides an interface between the processing component 1202 and peripheral interface modules, such as a keyboard, a click wheel, buttons, and the like. These buttons may include, but are not limited to, a home button, a volume button, a starting button, and a locking button.

The sensor component 1214 includes one or more sensors for providing state assessments of various aspects of the apparatus 1200. For example, the sensor component 1214 can detect an open/closed state of the apparatus 1200, relative positioning of components, such as the display and the keypad of the apparatus 1200. The sensor component 1214 can also detect a change in position of one component of the apparatus 1200 or the apparatus 1200, the presence or absence of user contact with the apparatus 1200, an orientation, or an acceleration/deceleration of the apparatus 1200, and a change in temperature of the apparatus 1200. The sensor component 1214 can also include a proximity sensor configured to detect the presence of nearby objects without any physical contact. The sensor component 1214 can also include a light sensor, such as a CMOS or CCD image sensor, configured to use in imaging applications. In some embodiments, the sensor component 1214 can also include an accelerometer sensor, a gyroscope sensor, a magnetic sensor, a pressure sensor, or a temperature sensor.

The communication component 1216 is configured to facilitate wired or wireless communication between the apparatus 1200 and other devices. The apparatus 1200 can access a wireless network based on a communication standard, such as Wi-Fi, 2G, 3G or a combination thereof. In some embodiments, the communication component 1216 receives broadcast signals or broadcast associated information from an external broadcast management system via a broadcast channel. In some embodiments, the communication component 1216 also includes a near field communication (NFC) module to facilitate short-range communications. For example, the NFC module can be implemented based on radio frequency identification (RFID) technology, infrared data association (IrDA) technology, ultra-wideband (UWB) technology, Bluetooth (BT) technology and other technologies.

In some embodiments, the apparatus 1200 may be implemented with one or more application specific integrated circuits (ASICs), digital signal processors (DSPs), digital signal processing devices (DSPDs), programmable logic devices (PLDs), field programmable Gate arrays (FPGAs), controllers, microcontrollers, microprocessors or other electronic components, to perform the above methods.

In some embodiments, there is also provided a non-transitory computer-readable storage medium including instructions, such as a memory 1204 including instructions executable by the processor 1220 of the apparatus 1200 to perform the above methods. For example, the non-transitory computer readable storage medium may be a ROM, a random-access memory (RAM), a CD-ROM, a magnetic tape, a floppy disc, and an optical data storage device, or the like.

A non-transitory computer-readable storage medium, when instructions in the storage medium are executed by a processor of a mobile terminal, enabling the mobile terminal to perform a call management method, the method includes:

detecting a call type of a call;

starting a call management interface corresponding to a current call type, when the call type of the call is changed.

Various embodiments of the present disclosure provide a call management method and apparatus. A call type of a call is continuously detected during the call, and a call management interface corresponding to a current call type is started when the call type of the call is changed, which realizes flexible switching and changing of the interface when participants of the conference call change, solves the problem of poor user experience when a conference call interface is used in a single line call, and improves the user experience.

For example, the upper layer application IncallUI interface will re-arrange the call management interface as a call management interface of a normal single line call after receiving the update of the non-conference type (such as a single line call), and at this time, the user can add contacts again. After the contact is added, the call will be converted to the Conference Call again, without affecting any function of the Conference Call, and the user experience has been greatly improved.

Various embodiments the present disclosure can be implemented by software, which does not need to increase any hardware cost, and it only involves the AP side, which does not require any modification on the bottom layer Modem side, and the cost is low. In some other embodiments, the methods, apparatuses, and systems disclosed herein can be implemented by hardware, software, or a combination thereof.

In some embodiments of the methods described above, the step of detecting a call type includes:

detecting a number of current participants in the call;

determining a current call type of the call according to the number of participants.

In some embodiments, the call type includes at least any or all of:

a conference call, a single line call, wherein the number of participants in the conference call is at least three, and the number of participants in the single line call is two.

In some embodiments, the method further includes:

configuring respective corresponding call management interfaces for different call types.

In some embodiments, the step of starting a call management interface corresponding to a current call type, when the call type of the call is changed includes:

maintaining a connection state of the conference call in a background and starting a call management interface corresponding to the single line call, when the call type of the call is changed from the conference call to the single line call.

In some embodiments, the step of maintaining a connection state of the conference call in a background and starting a call management interface corresponding to the single line call includes:

deleting all passive answering side participants from a tracking record of a Telephony layer;

notifying a Telecom layer that the current call type is no longer a conference call type;

deleting a conference capability from recorded information, and setting a name and/or an address of the current call as a name and/or an address of a remaining individual passive answering side participant;

rearranging the interface and starting the call management interface corresponding to the single line call, after a telephone service interface layer detects that the conference capability is deleted.

In some embodiments, the step of starting a call management interface corresponding to a current call type, when the call type of the call is changed includes:

maintaining a connection state of the conference call in a background and starting a call management interface corresponding to the conference call, when the call type of the call is changed from the single line call to the conference call.

In some embodiments, the step of maintaining a connection state of the conference call in a background and starting a call management interface corresponding to the conference call, when the call type of the call is changed from the single line call to the conference call includes:

re-adding all passive answering side participants of the conference call to a tracking record of a Telephony layer, after the Telephony layer detects that the number of the passive answering side participants is greater than 1;

adding a conference capability to recorded information and notifying a Telecom layer that the current call type is the conference call;

rearranging the interface and starting the call management interface corresponding to the conference call, after a telephone service interface (IncallUI) layer detects that the conference capability is added.

In some embodiments of the apparatuses described above, the type detection module includes:

an amount detection unit, configured to detect a number of current participants in the call;

a type determining unit, configured to determine a current call type of the call according to the number of participants.

In some embodiments, the call type includes at least any or all of:

a conference call, a single line call, wherein the number of participants in the conference call is at least three, and the number of participants in the single line call is two, wherein the apparatus further includes:

an interface configuration module, used to configure respective corresponding call management interfaces for different call types.

In some embodiments, the interface switching module includes:

a first switching unit, configured to maintain a connection state of the conference call in a background and start a call management interface corresponding to the single line call, when the call type of the call is changed from the conference call to the single line call;

a second switching unit, configured to maintain a connection state of the conference call in a background and start a call management interface corresponding to the conference call, when the call type of the call is changed from the single line call to the conference call.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms, and these phrases may be interchangeably used.

The terms "first" and "second" are used for descriptive purposes only and are not to be construed as indicating or implying a relative importance or implicitly indicating the number of technical features indicated. Thus, elements referred to as "first" and "second" can include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

It is to be understood that "multiple" mentioned in the present disclosure refers to two or more than two. "And/or" describes an association relationship of associated objects and represent that three relationships can exist. For example, A and/or B can represent three conditions, i.e., independent existence of A, coexistence of A and B and independent existence of B. Character "I" usually represents that previous and next associated objects form an "or" relationship.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a mark-up language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

What is claimed is:

1. A call management method, comprising:
   detecting a call type of a call; and
   starting a call management interface corresponding to a current call type, when the call type of the call is changed,
   wherein the call type comprises at least one of a conference call and a single line call;
   wherein a number of participants in the conference call is at least three, the conference call includes one active calling side participant and at least two passive answering side participants, and a number of participants in the single line call is two, the single line call includes one active calling side participant and one passive answering side participant,
   wherein the starting a call management interface corresponding to a current call type, when the call type of the call is changed comprises:
   maintaining a connection state of the conference call in a background, rearranging the interface, and
   starting a call management interface corresponding to the single line call, when the call type of the call is changed from the conference call to the single line call.

2. The call management method according to claim 1, wherein the detecting a call type comprises:
   detecting a number of current participants in the call; and
   determining a current call type of the call according to the number of current participants.

3. The call management method according to claim 1, further comprising:
   configuring respective corresponding call management interfaces for different call types.

4. The call management method according to claim 1, wherein the maintaining a connection state of the conference call in a background and starting a call management interface corresponding to the single line call comprises:
   deleting all passive answering side participants from a tracking record of a Telephony layer;
   notifying a Telecom layer that the current call type is no longer a conference call type;
   deleting a conference capability from recorded information, and setting a name and/or an address of the current call as a name and/or an address of a remaining individual passive answering side participant; and
   rearranging the interface and starting the call management interface corresponding to the single line call, after a telephone service interface layer detects that the conference capability is deleted.

5. The call management method according to claim 1, wherein the starting a call management interface corresponding to a current call type, when the call type of the call is changed further comprises:
   maintaining the connection state of the conference call in the background and starting the call management interface corresponding to the conference call, when the call type of the call is changed from the single line call to the conference call.

6. The call management method according to claim 5, wherein the maintaining a connection state of the conference call in a background and starting a call management interface corresponding to the conference call, when the call type of the call is changed from the single line call to the conference call comprises:
   re-adding all passive answering side participants of the conference call to a tracking record of a Telephony layer, after the Telephony layer detects that the number of the passive answering side participants is greater than 1;
   adding a conference capability to recorded information and notifying a Telecom layer that the current call type is the conference call; and
   rearranging the interface and starting the call management interface corresponding to the conference call, after a telephone service interface layer detects that the conference capability is added.

7. A communication system implementing the method according to claim 1, comprising at least one terminal for use by an active calling side participant to initiate the call,
   wherein the call type of a call is continuously detected during the call, and the call management interface corresponding to the current call type is automatically started when the call type of the call is changed, thereby realizing flexible switching and changing of the interface when participants of the conference call change.

8. The communication system according to claim 7, wherein the method further comprises:
   in a case that the call type of the call is changed from the conference call to the single line call;
      deleting all passive answering side participants from a tracking record of a Telephony layer;
      notifying a Telecom layer that the current call type is no longer a conference call type;
      deleting a conference capability from recorded information;
      setting a name and/or an address of the current call as a name and/or an address of a remaining individual passive answering side participant;
      rearranging the interface and starting the call management interface corresponding to the single line call after a telephone service interface (IncallUI) layer detects that the conference capability is deleted, thereby automatically changing the interface from a conference call interface to a single line call interface upon the participants of the conference call change to two
   in a case that the call type of the call is changed from the single line call to the conference call, maintaining the connection state of the conference call in the background and starting the call management interface corresponding to the conference call;

re-adding all passive answering side participants of the conference call to a tracking record of a Telephony layer, after the Telephony layer detects that the number of the passive answering side participants is greater than 1;

adding a conference capability to recorded information and notifying a Telecom layer that the current call type is the conference call;

rearranging the interface and staring the call management interface corresponding to the conference call, after an IncallUI layer detects that the conference capability is added;

wherein behaviors of the bottom layer Modem and the network side are not changed, the network and Modem are still configured according to the conference call, and the reported connection state is still the Conference Call state; a new Conference Event Package (CEP) is obtained, and the passive answering side participants are added to the conference call without changing an underlying processing flow while the user interface is switched.

9. A call management apparatus, comprising:
a processor;
memory storing instructions executable by the processor, wherein the processor is configured to:
detect a call type of a call; and
start a call management interface corresponding to a current call type, when the call type of the call is changed,
wherein the call type comprises at least one of a conference call and a single line call;
wherein a number of participants in the conference call is at least three, the conference call includes one active calling side participant and at least two passive answering side participants, and
a number of participants in the single line call is two, the single line call includes one active calling side participant and one passive answering side participant,
wherein the starting a call management interface corresponding to a current call type, when the call type of the call is changed comprises:
maintaining a connection state of the conference call in a background, rearranging the interface, and
starting a call management interface corresponding to the single line call, when the call type of the call is changed from the conference call to the single line call.

10. The call management apparatus according to claim 9, wherein the processor is further configured to:
detect a number of current participants in the call; and
determine a current call type of the call according to the number of current participants.

11. The call management apparatus according to claim 9, wherein:
the processor is further configured to configure respective corresponding call management interfaces for different call types.

12. The call management apparatus according to claim 11, wherein the processor is further configured to:
maintain the connection state of the conference call in the background and start the call management interface corresponding to the conference call, when the call type of the call is changed from the single line call to the conference call.

13. The call management apparatus according to claim 10, wherein:
the processor is further configured to configure respective corresponding call management interfaces for different call types.

14. A non-transitory computer-readable storage medium having instructions stored therein for execution by a processor of a mobile terminal to enable the mobile terminal to perform a call management method, the method comprising:
detecting a call type of a call; and
starting a call management interface corresponding to a current call type, when the call type of the call is changed,
wherein the call type comprises at least one of a conference call and a single line call;
wherein a number of participants in the conference call is at least three, the conference call includes one active calling side participant and at least two passive answering side participants, and
a number of participants in the single line call is two, the single line call includes one active calling side participant and one passive answering side participant,
wherein the starting a call management interface corresponding to a current call type, when the call type of the call is changed comprises:
maintaining a connection state of the conference call in a background, rearranging the interface, and
starting a call management interface corresponding to the single line call, when the call type of the call is changed from the conference call to the single line call.

15. The non-transitory computer-readable storage medium according to claim 14, wherein the call type of a call is continuously detected during the call, and the call management interface corresponding to the current call type is automatically started when the call type of the call is changed, thereby realizing flexible switching and changing of the interface when participants of the conference call change.

16. The non-transitory computer-readable storage medium according to claim 15, wherein the method further comprises automatically changing the interface from a conference call interface to a single line call interface upon the participants of the conference call change to two.

17. The non-transitory computer-readable storage medium according to claim 16, wherein the method further comprises:
in a case that the call type of the call is changed from the conference call to the single line call,
deleting all passive answering side participants from a tracking record of a Telephony layer;
notifying a Telecom layer that the current call type is no longer a conference call type;
deleting a conference capability from recorded information;
setting a name and/or an address of the current call as a name and/or an address of a remaining individual passive answering side participant;
rearranging the interface and starting the call management interface corresponding to the single line call after a telephone service interface (IncallUI) layer detects that the conference capability is deleted;
in a case that the call type of the call is changed from the single line call to the conference call,
maintaining the connection state of the conference call in the background and starting the call management interface corresponding to the conference call;

re-adding all passive answering side participants of the conference call to a tracking record of a Telephony layer, after the Telephony layer detects that the number of the passive answering side participants is greater than 1;

adding a conference capability to recorded information and notifying a Telecom layer that the current call type is the conference call;

rearranging the interface and staring the call management interface corresponding to the conference call, after an IncallUI layer detects that the conference capability is added.

\* \* \* \* \*